United States Patent
Samsioe et al.

(10) Patent No.: US 8,606,478 B2
(45) Date of Patent: Dec. 10, 2013

(54) SYSTEM AND METHOD FOR CONTROLLING A FOUNDATION BRAKE

(75) Inventors: Jens Samsioe, Göteborg (SE); Peter Lingman, Hindås (SE)

(73) Assignee: Volvo Lastvagnar AB, Göteborg (SE)

( * ) Notice: Subject to any disclaimer, the term of this patent is extended or adjusted under 35 U.S.C. 154(b) by 512 days.

(21) Appl. No.: 12/747,905

(22) PCT Filed: Dec. 12, 2007

(86) PCT No.: PCT/SE2007/001104
§ 371 (c)(1),
(2), (4) Date: Jun. 16, 2010

(87) PCT Pub. No.: WO2009/075614
PCT Pub. Date: Jun. 18, 2009

(65) Prior Publication Data
US 2010/0280729 A1 Nov. 4, 2010

(51) Int. Cl.
*B60T 8/32* (2006.01)

(52) U.S. Cl.
USPC .......... 701/93; 701/70; 701/71; 701/75; 701/78; 701/82; 701/84; 701/87; 701/89; 701/94; 303/136; 303/137; 303/167; 303/166; 303/176; 318/63; 318/64; 318/139; 318/375; 318/432

(58) Field of Classification Search
USPC .......................................................... 701/70
See application file for complete search history.

(56) References Cited

U.S. PATENT DOCUMENTS

| | | | | |
|---|---|---|---|---|
| 3,818,295 A * | 6/1974 | Poppinger et al. | ............ | 318/743 |
| 6,529,816 B1 * | 3/2003 | Yamaguchi et al. | .......... | 701/110 |
| 6,536,408 B1 * | 3/2003 | Warner | ................... | 123/323 |
| 6,804,598 B2 | 10/2004 | Eckert et al. | | |
| 7,152,935 B2 * | 12/2006 | Kinder et al. | ............ | 303/191 |
| 7,308,352 B2 * | 12/2007 | Wang et al. | ............. | 701/70 |
| 2004/0212251 A1 * | 10/2004 | Kinder et al. | ............ | 303/191 |
| 2004/0262994 A1 | 12/2004 | Baumann et al. | | |
| 2007/0194623 A1 | 8/2007 | Miyazaki | | |
| 2009/0203498 A1 * | 8/2009 | Lingman et al. | ............. | 477/183 |

FOREIGN PATENT DOCUMENTS

| | | |
|---|---|---|
| DE | 3940456 A1 | 6/1991 |
| EP | 1270358 A2 | 1/2003 |
| WO | 2007078230 A1 | 7/2007 |

OTHER PUBLICATIONS

International Search Report for corresponding International Application PCT/SE2007/001104.
International Preliminary Report on Patentability for corresponding International Application PCT/SE2007/001104.

* cited by examiner

*Primary Examiner* — Redhwan K Mawari
(74) *Attorney, Agent, or Firm* — WRB-IP LLP (57) ABSTRACT

A system and a method are provided for controlling a foundation brake of a vehicle having at least one foundation brake device, wherein the usability of the foundation brake is limited to a predetermined total application-time of the foundation brake within a predetermined time interval.

20 Claims, 6 Drawing Sheets

SYSTEM AND METHOD FOR CONTROLLING A FOUNDATION BRAKE

BACKGROUND AND SUMMARY

The present invention relates to a system and a method for controlling and protecting a foundation brake device of vehicles, particularly trucks, busses and other heavy goods vehicles.

The brake system of a vehicle usually comprises a foundation brake which is a basic drum or disk brake assembly with brake pads fitted to each axle or wheel which produces a braking force necessary to decelerate the vehicle or to bring the vehicle to a stop. If a foundation brake is used excessively, such as if it is applied several times over a prolonged period of time, fatigue or fading, i.e. gradual or sudden loss of braking power, may occur. This is due to the fact that, if brake pads are used excessively, their optimal working temperature is exceeded and their friction coefficient decreases, since certain elements of a brake pad can start to melt and/or vaporise. Furthermore, very frequent brake applications may cause large temperature variations in the brake and hence cause thermal fatigue of the disc.

In order to protect a foundation brake many vehicles are equipped with a supplementary auxiliary brake, e.g. a retarder. A retarder is a device that is permanently fitted to the vehicle's engine or transmission to augment the vehicle's braking capability during prolonged brake application. Such a supplementary auxiliary brake may be used to protect a foundation brake and give the driver greater control and improved brake performance.

Modern vehicles are also often equipped with an adaptive or intelligent cruise control system that can automatically adjust the vehicle's speed to maintain a safe following distance to a vehicle travelling in front or keep the vehicle on a pre-set velocity. An ACC device usually utilises a radar, installed behind the grill of the vehicle, to detect the speed and distance of the vehicle in front. If the vehicle in front slows down or travels slowly or the pre-set velocity is exceeded, the ACC device sends a signal to the engine or braking system of the vehicle to decelerate. Then, when the road is clear, the ACC device re-accelerates the vehicle back to a pre-set speed. Thus, the ACC controls the braking behaviour of the vehicle.

The U.S. Pat. No. 6,044,321 describes such an adaptive cruise control system for a vehicle, wherein applying of a brake is defined by a keeping a defined vehicle-to-vehicle distance. In case the adaptive cruise control decides that a braking operation is necessary for keeping the defined vehicle-to-vehicle distance a retarder is applied and if applying the retarder is not sufficient an automatic brake is continuously operated until the desired vehicle-to-vehicle distance is gained.

Unfortunately, the braking behaviour applied by the adaptive cruise control system according to the state of the art is not applicable to heavy loaded vehicles such as trucks, since the continuous operation of the brakes, particularly of the foundation brakes, easily results in over usage of the vehicles braking system. But also the brakes of all other kind of vehicles show an increased fatigue due to the continuous activation of foundation brakes by an adaptive cruise control system in order to keep the distance to a vehicle in front when driving behind a slow vehicle e.g. in a steep downhill slope.

Therefore, it has been suggested in the patent application WO 2007/078230, to disengage the ACC in case the temperature of the brakes exceeds a pre-set threshold. But, that also means that the driver needs to be informed that the ACC is deactivated and he has to take over control immediately, which reduces the driving comfort and is not desired by the driver.

It is therefore desirable to provide an automated system and method for controlling and protecting a foundation brake in a vehicle which reduce the risk of harmful thermal fatigue problems of foundation brakes.

The invention is based on the general idea that a foundation brake is best protected if frequent or long duration applications of a foundation brake are minimised. For that, the system comprises a control unit which limits the usability of the foundation brake to a predetermined total application-time of the foundation brake within a predetermined time interval.

The total application-time of the foundation brake can be added up from several short application-times of the foundation brake during the predetermined time interval. That means that, for example, if the total application time of the foundation brake is predetermined to 12 s within a time interval of 60 s, the foundation brake can be applied 3 times for 4 s during the time interval of 60 s. This ensures that the foundation brake is not over-used and fatigue and damage due to excessive use of the foundation brake are minimized.

The application of the foundation brakes is preferably initiated if/when the vehicle reaches a minimum distance to a vehicle travelling in front or exceeds a maximum speed. The minimum distance and the maximum speed can advantageously be detected by an adaptive cruise control device, wherein the minimum distance is defined as the distance the vehicle at least needs for not colliding with a vehicle in front, if the vehicle in front suddenly stops or decelerated significantly. The maximum speed is the highest speed the vehicle can travel the road safely. Both minimum distance and maximum speed are dependent on environmental conditions, such as road slope, road conditions, weather conditions, and/or vehicle characteristic conditions, such as vehicle speed, vehicle weight, payload, braking power and/or inter-vehicle conditions, such as inter-vehicle speed.

On the other side, the time between the applications of the foundation brakes is not determined. Thus, the foundation brake can be applied for example for 3 s, released for 15 s, re-applied for 5 s, released for 12 s, re-applied for 2 s, released for 20 s and then reapplied for 2 s, and still easily fulfils the condition of the maximum total application time of 12 s within the predetermined time interval of 60 s.

In a further preferred embodiment, the release-time interval depends on the whether the vehicle reaches the minimum distance to the vehicle in front or exceeds the maximum speed, again. That means, e.g. if the vehicle is running down a slope road, the foundation brakes are applied for some seconds until the distance to a vehicle in front is significantly large and then the foundation brakes are released and the vehicle is allowed to "roll up" to the minimum distance and/or the maximum speed again.

Preferably, during the application of the foundation brakes, the required braking power and thus the application-time and strength of the foundation brake are calculated in order to enable the vehicle to run for a plurality of seconds without re-application of the foundation brakes before the minimum distance and/or a maximum speed is re-reached. The calculation of the required braking power takes also into account environmental conditions, such as road slope, road conditions, weather conditions, and/or vehicle characteristic conditions, such as vehicle speed, vehicle weight, payload, braking power and/or inter-vehicle conditions, such as inter-vehicle speed The total application-time of the foundation brakes and the predetermined time interval are preferably pre-set by a manufacturer of the vehicle or of the brakes and can be optimised for the vehicle and the vehicle's allowable pay load.

In another preferred embodiment, the maximum total application-time and the time interval are predetermined each time the vehicle starts driving or is powered on. But it is also possible that the driver himself can initiate the determination of total application-time and time interval. This has the advantage that the total application-time can be adapted to the current vehicle condition, e.g. driving with or without pay load, whereby the foundation brakes can be further protected.

In a further preferred embodiment the vehicle further comprises at least one auxiliary brake device which can be applied throughout the deceleration process.

Additionally, the vehicle preferably comprises an adaptive cruise control device having a distance detecting unit for detecting a distance to a vehicle in front and/or a speed limitation unit for limiting the maximum speed of a vehicle. In case a predetermined distance to the vehicle in front is detected or the vehicle exceeds the maximum speed, the auxiliary brakes and/or the foundation brakes are applied in order to decelerate the vehicle.

In case the vehicle in front is very slow or the vehicles travels down a slope road, it is possible that the braking power applied by the auxiliary brakes is not sufficient for the required deceleration. Then, the system can additionally apply the foundation brakes for providing a sufficient braking power.

Further, a cruise control device comprising a preferred embodiment of the inventive system or being adapted to perform an embodiment of the inventive method is preferred.

In the following the present invention will be described in more detail with reference to the accompanying figures. The illustrated embodiments of the figures are exemplary only and are not intended to restrict the scope of the invention thereto. The scope of the invention is defined by the appended claims.

DETAILED DESCRIPTION

Figure 1:
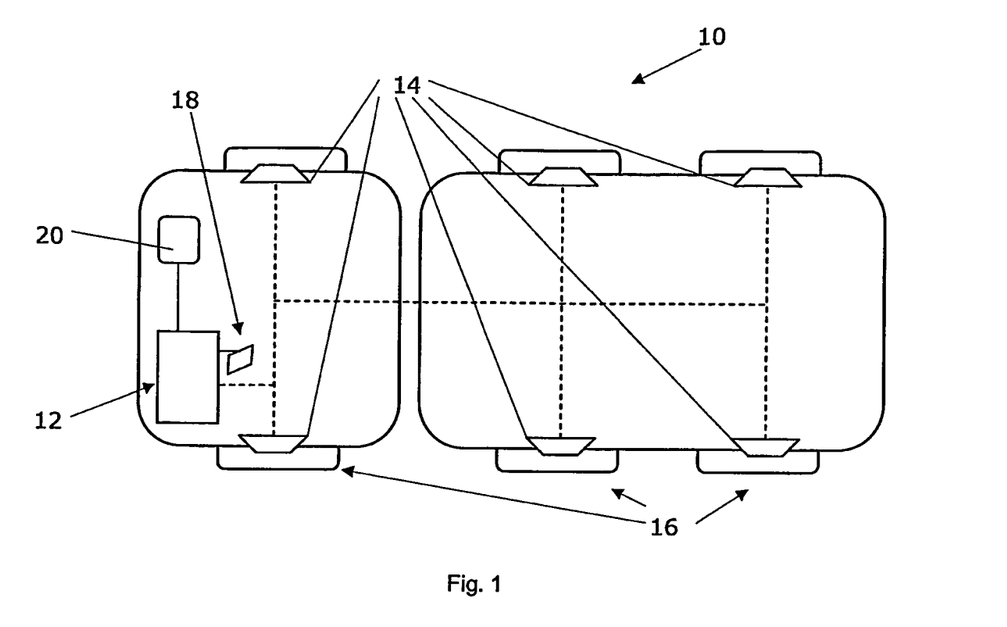
FIG. 1: a schematic top view of a vehicle comprising a system according to an embodiment of the invention.

FIG. 1 shows a vehicle 10 comprising a system 12 for controlling the foundation brakes 14 of the vehicle. A disc or drum brake assembly constituting a foundation brake 14 is fitted on each end of each axle of the vehicle 10. When the driver of the vehicle 10 presses the foot brake pedal 18 the foundation brake 14 produces the braking force necessary to bring the vehicle to a stop through the wheels 16. The system 12 comprises an ACC device 20 that detects the speed and distance of any road users in front of the vehicle 10 and automatically adjusts the vehicle's speed to maintain a safe following distance. The ACC device 20 uses one or more auxiliary brake devices and the foundation brake of the vehicle to keep the desired speed and to keep the desired distance to a vehicle in front of the vehicle. The system 12 distributes the braking force desired by the ACC device to the auxiliary brake devices and to the disc or drum brake assemblies of the foundation brake 14. This blending of brake force to the auxiliary brake devices and the foundation brake is well-known to the skilled person and is not described in detail. The vehicle may be a single vehicle or a vehicle combination, e.g. a tractor/trailer combination. The vehicle is preferably a heavy vehicle such as a truck, bus or a construction vehicle.

FIGS. 2 and 3A to 3C illustrate a downhill following scenario with insufficient brake capacity of auxiliary brakes, which is the typical application for the present invention.

Figure 2:
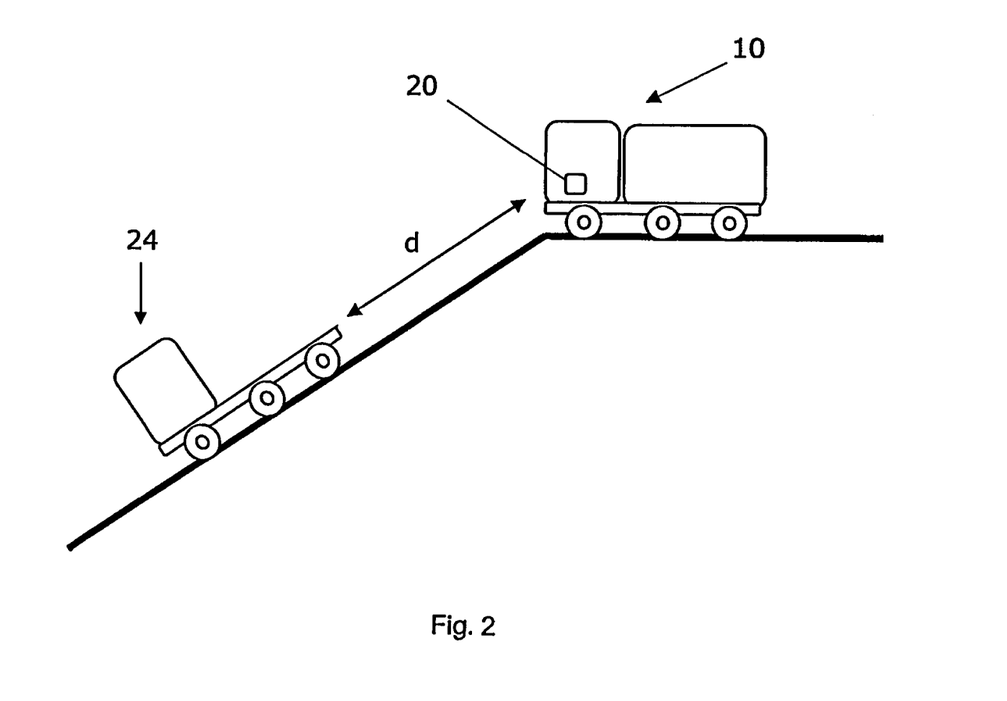
FIG. 2: an illustration of a downhill following scenario.

FIG. 2 shows a vehicle 10 (ego vehicle) which is just about to follow a vehicle 24 (target vehicle) down a long descent, wherein the ego vehicle is heavier than the target vehicle, e.g. due to pay load, which results in a higher downhill-slope force. Vehicle 10 is equipped with an ACC device 20 comprising a preferred embodiment of the inventive system 12 and a radar installed behind the grill of the vehicle 10 to detect the speed and distance of the other vehicle 24. The ACC device 20 is arranged to keep the vehicle 10 travelling at a pre-set speed when no vehicle is in front of vehicle 10, and to maintain vehicle 10 at a desired distance d behind a vehicle when there is a vehicle in front of vehicle 10. Since vehicle 10 is heavier than vehicle 24, the required brake power is higher for vehicle 10 than for vehicle 24. Therefore the braking power of the auxiliary brakes are not sufficient to keep a constant distance to the vehicle in front.

As soon as the vehicle 10 gets too close to the target vehicle 24, the ACC device 20 sends a signal to the system 12 to decelerate the vehicle 10 which in turn applies the foundation brakes 14 of vehicle 10 in order to maintain the desired distance d between the vehicles 10 and 24. The foundation brakes are applied since the auxiliary brake alone can not maintain the desired distance d. The distance between the vehicles may be defined as a time gap in seconds or as a distance in meters.

Figure 3A:
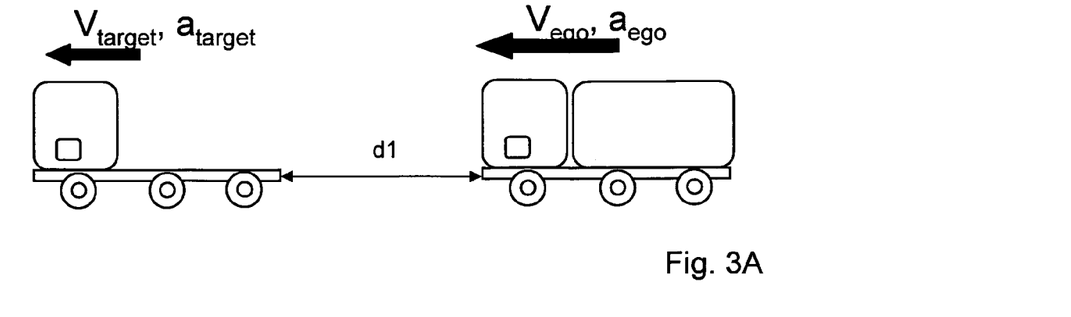
FIG. 3A-3C: a further illustration of the downhill following scenario.
Figure 3B:
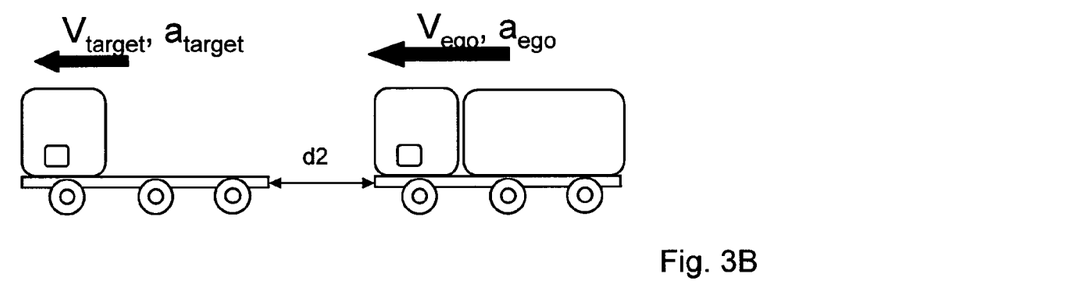
Figure 3C:
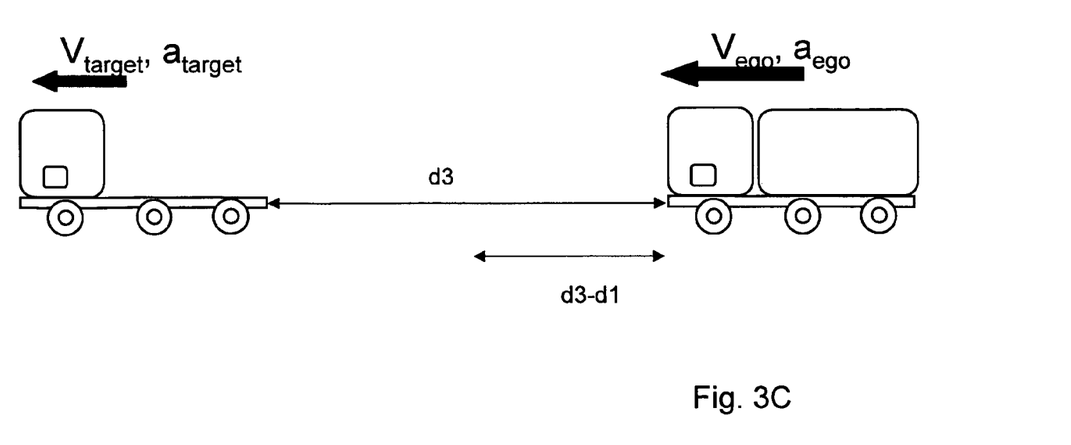

The braking and distance keeping problematic is illustrated in FIGS. 3A to 3C. As shown in FIG. 3A, the ego vehicle 10 having at least one auxiliary brake device and at least one foundation brake approaches the vehicle in front 24 (=target vehicle), whereby the ego vehicle 10 has a higher velocity than the target vehicle 24 ($v_{ego} > v_{target}$). In addition, it is assumed that ego vehicle 10 and target vehicle 24 are travelling downhill having an acceleration $a_{ego}$ and $a_{target}$ due to the slope of the road, whereby an insufficient auxiliary brake capacity adds to the acceleration $a_{ego}$ of the ego vehicle 10.

At a determined distance d1, derived from the inter-vehicle speed $v_{rel}$ and a critical minimum distance $d_{crit}$ which must not be under-run ($d_{crit}$ defines the absolute minimum distance the ego vehicle must keep in order to not collide with the vehicle in front) and/or which the driver selects, foundation brakes are applied with deceleration $$a_{brake} = f(a_{ego\_slope}(d1)) + f(v_{rel}, d),$$

wherein $a_{ego\_slope}$ (d1) is the acceleration of the ego vehicle 10 before distance d1, $v_{rel}$ is the relative inter-vehicle velocity $v_{rel} = v_{target} - v_{ego}$, and d is the distance between ego vehicle 10 and target vehicle 24.

The distance d1 is not constant but is a function of $v_{rel}$, since in case the ego vehicle 10 is much faster than the target vehicle 24, an earlier reaction is needed as for a slow ego vehicle 10.

The time needed for the ego vehicle 10 to decelerate to the same speed as the target vehicle 24 is $t_{12}$. During this time the distance between the target vehicle 24 and the ego vehicle 10 has further decreased to d2, see FIG. 3B. It is therefore necessary that the determination of distance d1 takes into account that the ego vehicle 10 is still approaching the target vehicle 24 for a time $t_{12}$. The distance d2 is should be equal or greater to an absolute minimum distance $d_{crit}$, the ego vehicle should keep to the target vehicle.

As shown in FIG. 3C, the deceleration is maintained at $a_{brake}$ until the distance between the ego vehicle 10 and the target vehicle 24 is d3. There the brakes are released and the ego vehicle 10 re-accelerates with roughly $a_{ego\_slope}$, assuming environmental conditions did not change much. The distance the ego vehicle 10 can roll up until it re-reaches a distance $d_{min}$ to the target vehicle 24, where the brakes need to be applied again, is $d3-d_{min}$. Note that the distance $d_{min}$ is only identical to d1, if roughly the same relative velocity $v_{rel}$ is given. In case the target vehicle accelerates or decelerates or the environmental conditions change, $d_{min}$ differs from d1.

The acceleration $a_{ego}$ of the ego vehicle 10 is directly coupled to how the foundation brakes and auxiliary brakes should be applied in order to avoid fatigue of the foundation brakes. In the inventive system, fatigue is defined as function of foundation brakes application time. To avoid fatigue, the system adds up the application times of the foundation brakes and limits the usability of the foundation brakes to a predetermined total application time during a predetermined time interval.

It has been found by the inventors by empiric testing that fatigue can be very good avoided, if the predetermined total application time is in the range of 10 s to 20 s during a predetermined time interval ranging between 40 s and 60 s. In the following, the predetermined total application time is set to 15 s and the time interval is predetermined to 50 s.

The approach to indirectly control the fatigue of the foundation brakes by applying the foundation brakes intermittently for a short time, does also mean that the distance d should be allowed to decrease to the minimum distance $d_{min}$ before the foundation brakes are applied. With other word, the ego vehicle does not keep a predetermined distance $d_{set}$ to the target vehicle as described in the state of the art but the distance d is allow to vary around a distance $d_{set}$.

The variation around the given distance $d_{set}$ is created by controlling the following vehicles brake force, i.e. by switching between using auxiliary brakes and auxiliary brakes and/or foundation brakes. In situations where the auxiliary brakes are saturated due to downhill driving, the foundation brakes are shortly applied (preferably in the range of 3 s to 5 s) in order to increase the current distance d to a vehicle in front.

The foundation brakes are applied at the latest when the current distance d is equal to a critical minimum distance $d_{min}$. The minimum distance $d_{min}$ is the shortest allowed distance between the ego vehicle and the target vehicle and it varies with the inter-vehicle relative speed $v_{rel}$, the severity of the road slope, loading condition, and auxiliary brake performance. The different distance values fulfill the following relation:

$$d_{min} \leq d \leq d_{set}.$$

Figure 4A:
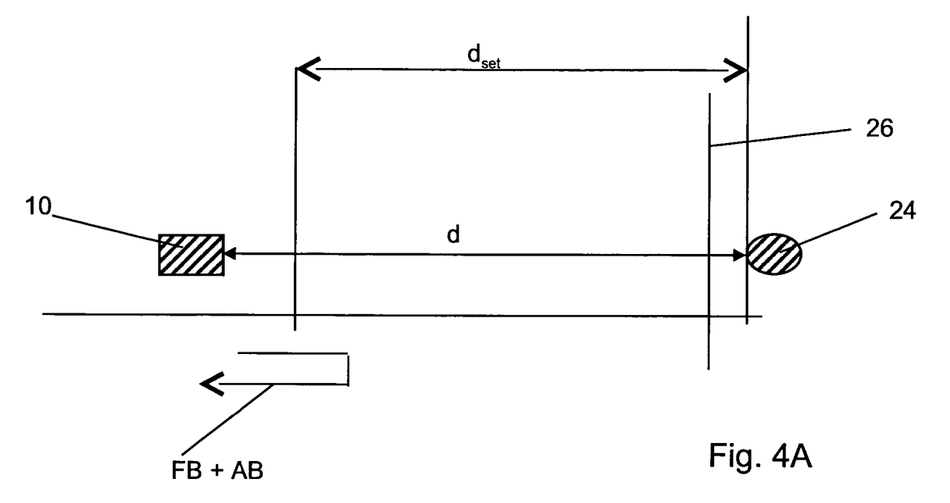
FIGS. 4A, 4B: a schematic comparison between a standard braking strategy and an embodiment of the inventive braking strategy.
Figure 4B:
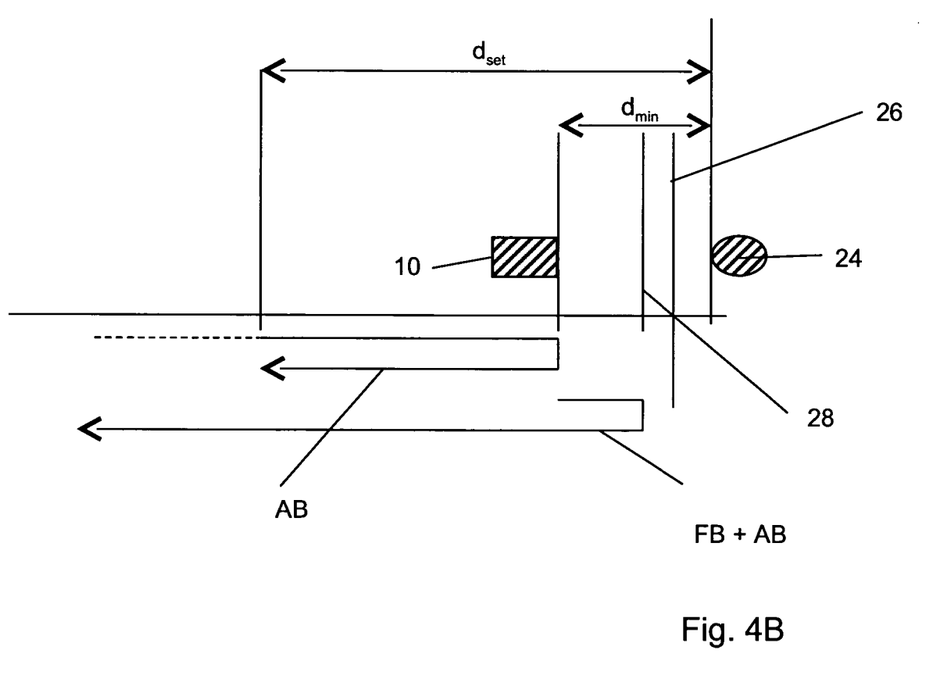

FIG. 4 shows the inventive braking strategy in comparison with the braking strategy according to the state of the art, wherein the state of the art is shown in FIG. 4A and the inventive strategy is illustrated in FIG. 4B.

FIG. 4A shows the target vehicle 24 and the ego vehicle 10. At a given distance $d_{set}$, set by the driver or the ACC system, the ego vehicle applies the foundation brakes in addition to the auxiliary brakes FB+AB in order reduce the distance d to the vehicle in front 24. Since the distance to the vehicle in front and the distance to a brake warning point 26 is quite long, the foundation brakes are only slightly applied resulting in a relatively small braking power and in a relatively small increase in distance. Therefore after a short time, the ego vehicle has re-reached the distance $d_{set}$ and the foundation brakes have to be re-applied, which can result in an over-use of the foundation brakes causing fatigue.

The distance $d_{set}$ can be set by the driver via an HMI (human machine interface), particularly a switch, button or menu. It is also possible that the system is storing a previously set $d_{set}$ value or even that the system monitors the behaviour of the driver and suggest $d_{set}$ values depending on already experienced driving situations and correspondingly set $d_{set}$ values.

Since, according to the invention, the use of the foundation brakes is limited to a predetermined total application-time during a predetermined time interval, it is advantageously also to use a new and inventive braking strategy. Instead of applying the foundation brakes at the given distance $d_{set}$, the ego vehicle 10 is allowed to roll up to the target vehicle 24 until a minimum distance $d_{min}$. Not until the minimum distance $d_{min}$ to the target vehicle is reached, the foundation brakes are applied with reasonable braking power for several seconds (preferably 3 s to 5 s), whereby the distance to d to the target vehicle 24 is increased significantly. At a turning point 28, well before the brake warning point 26, the acceleration turns into a deceleration so that the distance to the vehicle in front starts increasing. Preferably, the increase in distance d is so large that the foundation brakes need not to be applied for quite a long time (e.g. more than 10 seconds) and, therefore, are able to cool down. Thereby thermal fatigue is reduced and the lifetime of the foundation brakes is increased.

For calculating the required distances, application times and release times, the inventive system preferably uses a parameter called brake duration factor BD. It is understood by a person skilled in the art that the following description refers to a preferred embodiment. Any other possible approaches for determining the distances, application-times, release times, braking power etc. are also included within the scope of the patent.

The brake duration factor which monitors the application-times of the foundation brakes used in this preferred embodiment is defined by:

$$BD(t) = \int_{t1}^{t2} dt + BD(t_1), \quad (1)$$

if the foundation brakes are applied, and $$BD(t) = -\int_{t1}^{t2} a \, dt + BD(t_1), \quad (2)$$

if the foundation brakes are not applied
wherein a is a constant.

The constant a is given by the division of the predetermined total application-time with the predetermined time interval. As explained above, the inventors have found that the foundation brakes can be best protected by setting the predetermined time to 15 s and the time interval to 50 s, which results in $$a = \frac{15}{50}.$$

The brake duration factor may also depend on one or more of the following parameters: vehicle speed, brake pressure, brake disc temperature, ambient temperature, type of brake disc, type of brake pads. It is also possible to have different brake duration factors depending on these parameters. The constant a may also vary depending on these and other parameters. The brake duration factor BD may be calculated during a fixed time interval, i.e. the calculation of BD is done during a fixed time interval and then set to zero before the next calculation is done. BD may also be calculated during a floating time interval, i.e. the calculation of BD is done continuously.

Figure 5:
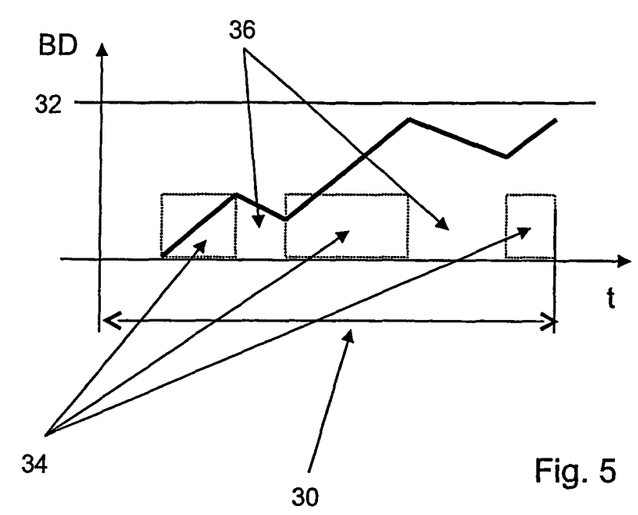
FIG. 5: a diagram of the brake duration factor BD as a function of time t.

FIG. 5 shows a diagram illustrating the development and summation of the brake duration factor BD over time t. The foundation brakes of the vehicle has not been used for a long time, thus the brake duration factor BD is zero at time t=0. The predetermined total application-time 32 and therefore the maximum BD limit is set to 15 s within a 50 s time interval 30 in this example. When BD reaches this limit, the usability of the foundation brakes is limited. The application time of the foundation brake is indicated by reference sign 34, wherein the release time of the foundation brake is indicated by reference sign 36.

As can be seen in FIG. 5, at time t=5, the vehicle brakes for 5 seconds. Set into the equations above, this results in a BD of 5 at time t=10 by using equation (1), since the vehicle is braking;

$$BD(t=10) = \int_5^{10} dt + BD(t=5) = 5 + 0 = 5$$

Then, the brakes are not engaged for 3 seconds. This results in a BD of 4.1, by using equation (2), since the vehicle is not braking. The constant a is here 15/50.

$$BD(t=13) = -\int_{10}^{13} \frac{15}{50} dt + BD(t=10) = -\frac{15}{50} * 3 + 5 = 4.1,$$

At t=13, the brakes are re-applied for 10 seconds, resulting in a BD of 14.1 by using expression (1).

$$BD(t=23) = \int_{13}^{23} dt + BD(t=13) = 10 + 4.1 = 14.1.$$

At t=23, the brake are released for 7 s and then re-applied for 2 s, which again results in a BD of 14.

$$BD(t=30) = -\int_{23}^{30} \frac{15}{50} dt + BD(t=23) = -\frac{15}{50} * 7 + 14.1 = 12,$$

$$BD(t=32) = \int_{30}^{32} dt + BD(t=30) = 2 + 12 = 14.$$

This means that the BD maximum limit is nearly reached and the next release time should be sufficiently long in order to have enough time for the foundation brakes to cool down. This in turn means that the distance to the vehicle in front or the deceleration of the ego vehicle achieved after the last braking must be that great that the foundation brakes can now be released for enough time to let them cool down.

Therefore, the distance d that must be achieved by the foundation brakes activation for allowing the foundation brakes to cool down and to fulfill the condition of the set total application-time during a predetermined time interval must be carefully calculated and, in this embodiment, is based on an estimated, one-cycle (the foundation brakes are applied, released and re-applied) addition to the brake duration factor BD(t), denoted $\Delta BD_{est}$, which is defined by $$\Delta BD_{est} = t - \frac{15}{50} T_{up\text{-}roll}$$

A "forward simulation" must (in this case an analytical solution) therefore be done at each sample to calculate an estimation of the "up-rolling time" $T_{up\text{-}roll}$, i.e. the time it would take the following vehicle to re-reach $d_{min}$ once the foundation brakes are released. This up-rolling time, or foundation brakes rest time, is calculated by the following equations (estimation is performed during a foundation brake activation), wherein it is further assumed, that the speed of the vehicle in front ($v_{target}$) is constant and that the brake force from the auxiliary brakes and the resistance forces, such as e.g. road slope, air, rolling etc., are all constant:

$$d_{est}(t) = d(t_{FBapp}) + V_{target}(t_{FBapp}) * t - \left(V_{ego_{est}}(t) * t - a_{ego}(t_{FBapp}) \times \frac{t^2}{2}\right)$$

$v_{ego_{est}}(t) = v_{ego}(t_{FBapp}) + a_{ego}(t_{FBapp}) * t$, wherein t ∈ [start of FB application=$t_{FBappl}$, end of FB application=$t_{FBrel}$];

$d_{est}(t)$, is the estimated distance, if the foundation brakes are released at time t;

$v_{ego_{est}}(t)$, is the estimated ego vehicle speed, if the foundation brakes are released at time t;

$d(t_{FBapp})$, indicates the distance at time t=$t_{FBapp}$, $v_{target}(t_{FBapp})$, indicates the target vehicle speed at time t=$t_{FBapp}$ $a_{ego}(t_{FBapp})$, indicates the target vehicle acceleration at time t=$t_{FBapp}$ $v_{ego}(t_{FBapp})$, indicates the following vehicle's speed at time t=$t_{FBapp}$, wherein t=$t_{FBapp}$ is when $d_{min}$ is reached and the foundation brakes must be used.

By choosing that $d_{est}(t) = d(t_{FBapp})$, and assuming stationary conditions (constant speed of target vehicle, constant road slope, constant resistance forces), the up-roll time, $T_{up\text{-}roll}$, can be calculated:

$$T_{up\text{-}roll} = \frac{-(v_{ego}(t_{FBappl.}) - v_{target}(t_{FBapp}) - T(t_{FBapp}) * a_{ego}(t_{FBapp}))}{a_{ego}(t_{FBapp})} -$$

$$\sqrt{\left(\frac{v_{ego}(t_{FBapp}) - v_{target}(t_{FBapp}) - T(t_{FBapp}) * a_{ego}(t_{FBapp})}{a_{ego}(t_{FBapp})}\right)^2 - 2\left(\frac{d(t_{FBapp}) - T(t_{FBapp}) * v_{ego}(t_{FBapp})}{a_{ego}(t_{FBapp})}\right)}$$

This means that the increment to the brake duration factor BD, i.e. $\Delta ABD_{est}$, can be calculated.

Since BD(t) and the increment $\Delta BD_{est}$ depend from a plurality of variables, the brake duration factor can be indirectly controlled by any suitable value. In most situations, the strategy to apply the foundation brakes until the increment $\Delta BD_{est}$ has reached 0 and then release the foundation brakes and allow an up-roll with saturated auxiliary brakes can be performed without problems, since that also means that the brake duration factor will never, exceed the preset allowed value of 15 s.

Figure 6:
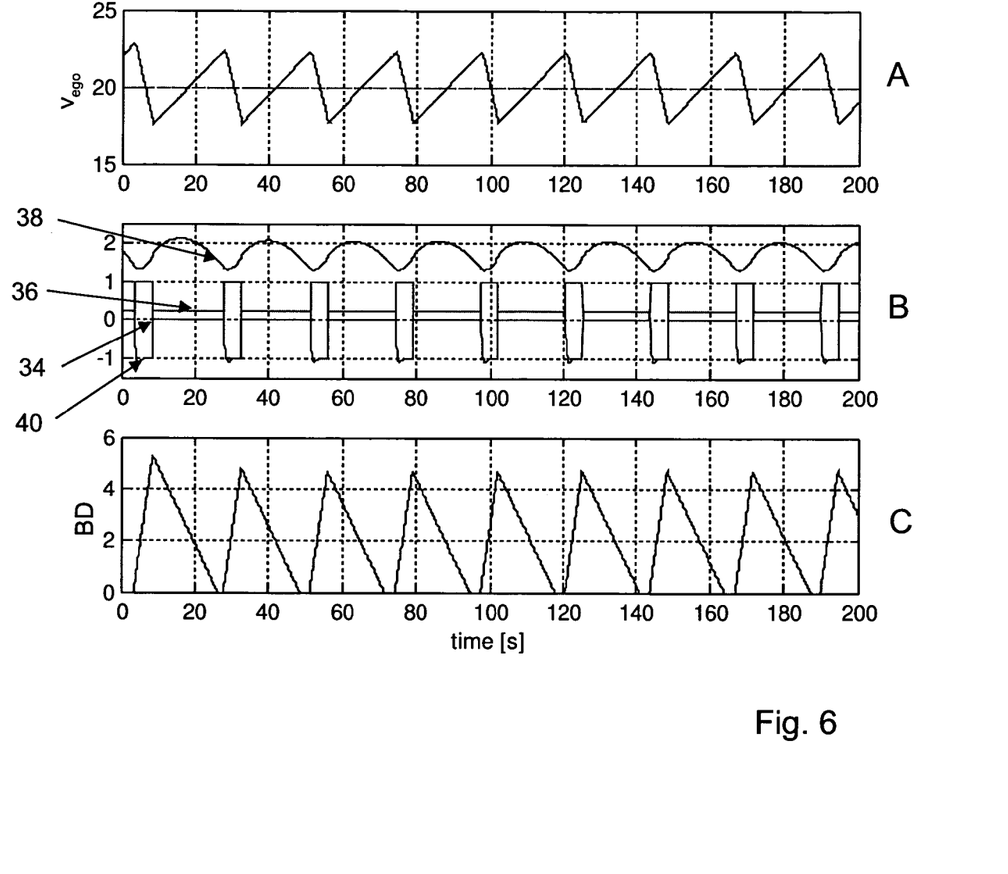
FIG. 6: a simulation of a behaviour of different vehicle parameter when using a preferred embodiment of the inventive method.
Figure 7:
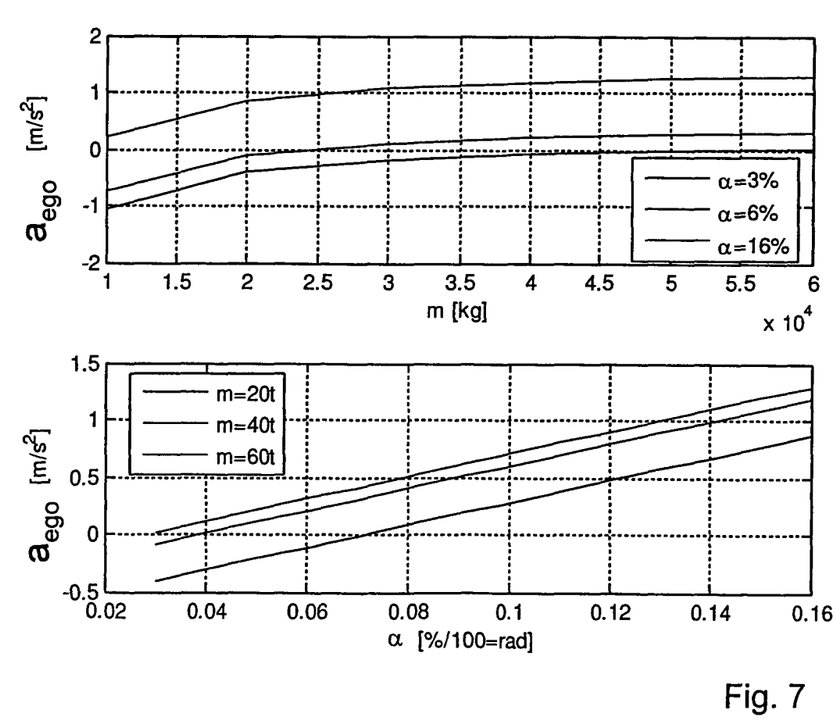
FIG. 7: a diagram of an acceleration as a function of vehicle weight and downhill slope.

FIG. 6 shows a simulation of the above explained method, wherein it is assumed that a truck having a total weight of 40 tons is travelling down road having a slope of 6% with a speed of 20 m/s. As can be seen in FIG. 7, full utilization of the vehicles engine brakes (=auxiliary brakes) will create an acceleration of 0.25 m/s².

FIG. 7 shows the acceleration $a_{ego}$ of the ego vehicle 10 as function of weight m and downhill slope α, wherein the weights m for trucks are ranging typically from 20 tons to 60 tons. The vehicle engine brake VEB (=auxiliary brake) is fully engaged and the gear position is selected to give an engine speed of approximately (discrete gearbox) 1800 rpm. The speed of the ego vehicle 10 is assumed to 20 m/s. As can be seen, in extreme situations (60 tons and 16% road slope a) the acceleration of the ego vehicle 10 due to downhill slope force is 1.2 m/s². For more realistic situations (40 tons and slope α<8%) the acceleration is always <0.5 m/s². Measurements on a road having a slope of α=6% gave a maximum acceleration of 0.25 m/s² for a vehicle having 40 tons.

Therefore, the assumed critical acceleration $a_{crit}$ for the simulation shown in FIG. 6 is set to 0.25 m/s². It is further assumed that a comfortable foundation brakes activation will change the acceleration from 0.25 m/s² to to −1 m/s² (i.e the deceleration is 4 times higher than the acceleration), and that a speed of a target vehicle is constant, $v_{target}$=constant. The foundation brakes are intended to be fully recovered after having been applied, which corresponds to a low brake duration factor (i.e. BD=0) when it is time to re-apply the foundation brakes in order to increase the distance to the vehicle in front.

In FIG. 6, the several vehicle parameter are shown as function of the foundation brakes application time. The first diagram of FIG. 6—FIG. 6A shows the speed of the ego vehicle $v_{ego}$ which varies between 18 to 22 m/s, wherein the $v_{target}$ is constant at 20 m/s.

The second diagram—FIG. 6B shows the development of the time gap values 38—with other words the distance—in relation to the application time 34 and the release time 36 of the foundation brakes. The top curve in FIG. 6B shows the development of the time gap values 38 which are increased from 1.2 s to approximately 2 s in order to ensure that the foundation bakes are not overused. The lower curve shows the corresponding application of the foundation brakes which are applied for 4.7 s (34) and released for 18.5 s (36). This ensures that the brake duration factor BD is 0 after each cycle (see for BD FIG. 6C). It can be also seen in FIG. 6B that the foundation brakes are applied slightly harder at the beginning of the brake intervention (1.2 m/s²) to reduce the relative speed in a comfortable way (see reference sign 40).

The last diagram of FIG. 6, FIG. 6C, illustrates the behaviour of the brake duration factor BD as calculated after the equations given above. As can be seen, the BD factor reaches zero, that means is full recovered when it is time to re-apply the foundation brakes, in order to re-increase the distance to the vehicle in front.

Figure 8:
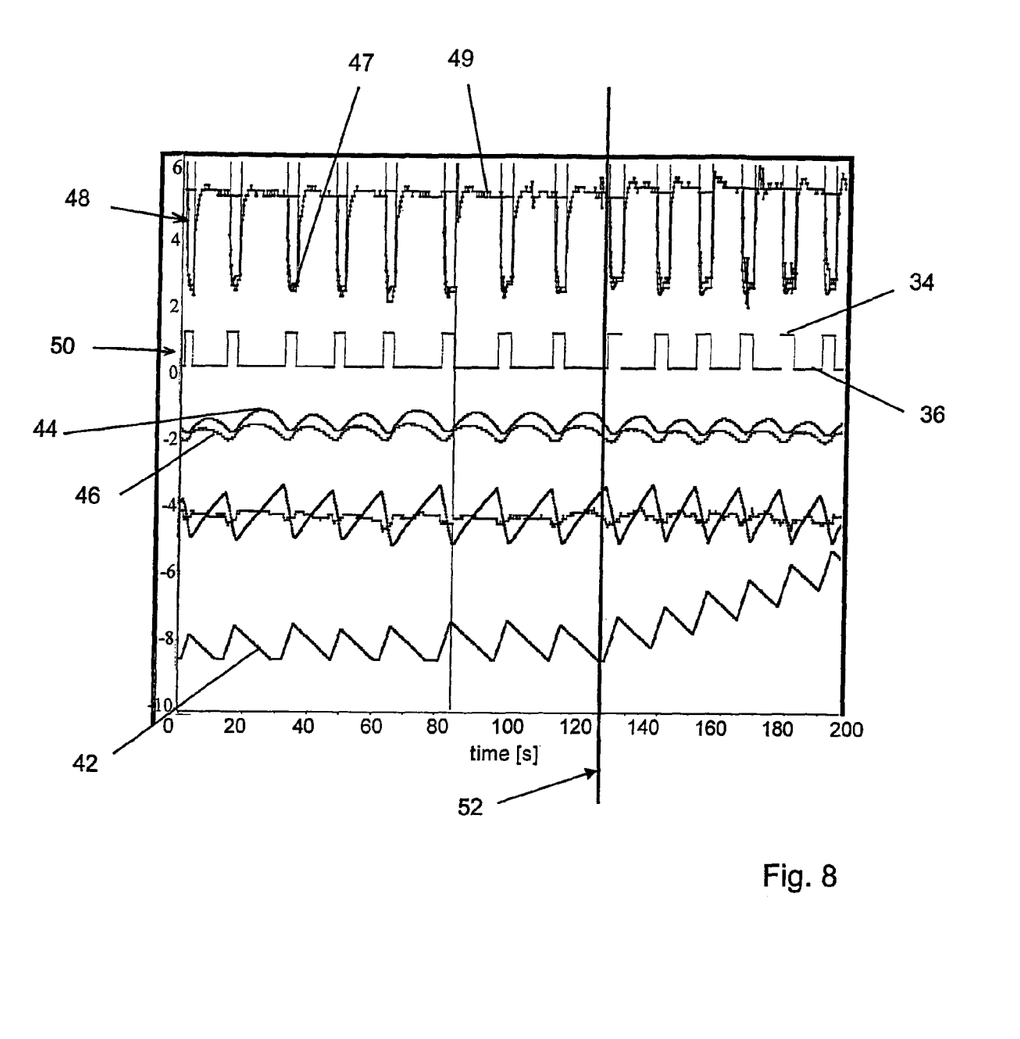
FIG. 8: a log file of a test performed with a truck comprising a preferred embodiment of the inventive system.

The simulation behaviour is resembled in reality as can be seen by comparing FIG. 6 and FIG. 8, wherein FIG. 8 shows a log files from a test performed at the downhill slope of Kallebäck, Sweden, wherein a truck was used running with 10 km/h faster than a target vehicle. The standard ACC function of the truck was deactivated and replaced by a preferred embodiment of the inventive system.

As long as the distance between truck and target is larger than $d_{min}$ the truck was allowed to accelerate by requesting a defined engine torque (using a simple controller for controlling the acceleration) to simulate the effects of a loaded truck in a slope.

If the distance is less than $d_{min}$ the foundation brakes are applied according to the inventive braking strategy as illustrated in FIG. 4B. As soon as the brakes are activated a calculation is running to check when the distance to the target vehicle is increased so much, that the expected time $T_{up\text{-}roll}$ to accelerate again with the same acceleration before activating the brakes compared with the current brake activation time does not increase the brake duration factor, that means that the brake duration factor has returned to zero before the foundation brakes are re-applied. This is normally given if the expected brake release time is 50/15 times higher than the current brake activation time. The behaviour of the brake duration factor BD is illustrated in graph 42 of FIG. 8.

As shown in FIG. 8 the truck accelerates with 0.4 m/s² until the distance to the target vehicle has decreased to $d_{min}$ (here about 1.3 s), as the truck is running 10 km/h faster than the target vehicle. The measurement of the distance to the target vehicle is illustrated in graph 44, wherein the corresponding time gap is shown in graph 46.

If the distance $d_{min}$ has been reached, the brakes are applied with approximately −1.5 m/s² for about 4 s. Under that time the trucks velocity is reduced and the distance increases. Graph 48 of FIG. 8 shows the velocity behaviour of the truck which is significantly reduced by application of the foundation brakes—see reference sign 4—and then the truck is allowed to re-accelerate to the former velocity—see reference sign 49. The corresponding application of the foundation brakes are indicated by graph 50 with application times indicated by 34 and release times indicated by 36.

The brakes are released when the calculated time for acceleration with the same acceleration before braking is enough to allow the brake duration factor BD (increased with 1/s) to return to zero if decreasing it with −15/50 while brakes are not applied. So the result for the brake duration factor BD after one cycle of braking/not braking is approximately zero.

To achieve the necessary release-time of the brakes the deceleration rate needed is quite high (about 4 times the positive acceleration due to the slope), which is about −1.2 m/s² to −1.6 m/s² or even more depending on the relative velocity, but is in this example limited anyhow to the overall ACC limit of −2 m/s². The braking is adapted to start smooth, so that, despite the high levels, the braking is experienced as comfortable. The brake activation time of about 3 s-4 s and the brake level is determined to reflect the behaviour of a normal truck driver in a downhill driving situation.

The difference between the driving on a plain road an a downhill road can be seen by comparing the variation in the graphs before and after 130 s, indicated by vertical line 52.

Before 130 s at the timeline both vehicles were running on a plain and after that both vehicles are driving down the slope at Kallebäck. Here the brake duration factor BD does not return fully to zero after one cycle but is increased with approximately by a factor of 1.4 after each cycle. This is due to the overshoot of the acceleration directly after release of the brakes while accelerating downhill, as the calculation only considers the acceleration directly measured before braking, which is all right for homogeneous acceleration caused by a fully loaded truck in a slope.

The invention claimed is:

1. A system for controlling a foundation brake of a vehicle having at least one foundation brake device, comprising a control unit arranged to limit operation of the foundation brake to a non-zero predetermined total application-time of the foundation brake within a non-zero predetermined time interval, the control unit further being arranged to adjust a braking power of the foundation brake so that a deceleration provided during the application time of the foundation brake enables the vehicle to run without reapplication of the foundation brake for a non-zero predetermined foundation brake rest time.

2. The system according to claim 1, wherein the system further comprises a calculation unit which calculates a brake duration factor (BD) for adding up the application-time periods and the release time periods of the foundation brake within the predetermined time interval to the total application-time of the foundation brake.

3. The system according to claim 2, wherein the calculation unit further calculates an increment ΔBD to the brake duration factor which determines the foundation brake rest time, wherein the increment is preferably added to the brake duration factor.

4. The system according to claim 1, wherein the system further comprises a distance detection and calculation unit for detecting a distance to a vehicle in front and calculating a minimum distance to a vehicle in front and/or a speed limitation unit for setting a maximum speed limit for the vehicle, and wherein the control unit applies the foundation brakes if/when a non-zero predetermined minimum distance to a vehicle in front is detected and/or the set maximum speed is exceeded.

5. The system according to claim 4, wherein the minimum distance and/or the maximum speed are/is determined dependent on environmental conditions, particularly road slope, road conditions and/or weather conditions.

6. The system according to claim 4, wherein the minimum distance and/or the maximum speed are/is determined dependent on a vehicle characteristic condition, particularly vehicle speed, vehicle weight and/or auxiliary brake performance.

7. The system according to claim 1, wherein the determined minimum distance and/or the maximum speed are/is constantly re-determined by the calculation unit.

8. The system according to claim 1, wherein the control unit further adjusts the braking power of the foundation brake in accordance with the detected minimum distance, the maximum speed limit, and/or the brake performance of the auxiliary brake.

9. The system according to claim 8, wherein the control unit adjusts the braking power taking into account environmental conditions, particularly road slope, road conditions, weather conditions.

10. The system according to claim 8, wherein the control unit adjusts the braking power taking into account vehicle characteristic conditions, particularly vehicle speed, vehicle weight, payload, and/or inter-vehicle conditions, particularly inter-vehicle speed.

11. The system according to claim 1, wherein the system further comprises a storage unit, in which the total application-time of the foundation brake and the time interval predetermined by a vehicle manufacturer or brake manufacturer are stored.

12. The system according to claim 1, wherein the calculation unit is further adapted to predetermine the total application-time of the foundation brake and the time interval, preferably each time the vehicle starts driving or is powered on.

13. The system according to claim 12, wherein the system further comprises a human-machine-interface which enables a driver of the vehicle to initiate the predetermination of the total application-time of the foundation brake and the time interval.

14. The system according to claim 1, wherein the predetermined total application-time of the foundation brake is in a range between 10 s and 20 s and the predetermined time interval is in a range between 45 s and 65 s.

15. A method for controlling a foundation brake of a vehicle having at least one foundation brake device, comprising:
limiting operation of the foundation brake to a non-zero predetermined total application-time of the foundation brake within a non-zero predetermined time interval; and
adjusting a braking power of the foundation brake so that a deceleration provided during the application time of the foundation brake enables the vehicle to run without reapplication of the foundation brake for a non-zero predetermined foundation brake rest time.

16. The method according to claim 15, further comprising calculating a brake duration factor (BD) for adding up the application-time periods and the release time periods of the foundation brake within the predetermined time interval to the total application-time of the foundation brake.

17. The method according to claim 16, further comprising calculating an increment ΔBD to the brake duration factor which determines the foundation brake rest time, wherein the increment is preferably added to the brake duration factor.

18. The method according to claim 16, wherein
The brake duration factor is calculated according to $$BD(t) = \int_{t_2}^{t_2} dt + BD(t_1)$$

for the application of the foundation brake; and $$BD(t) = -\int_{t_2}^{t_2} a\, dt + BD(t_1)$$

for the release of the foundation brake, and/or
The increment for the brake duration factor is calculated according to $$\Delta BD = t - \alpha * T_{up\_roll},$$

With $T_{up\_roll}$ indicating the foundation brake rest time; and wherein a is a constant, given by the division of the predetermined total application time with the predetermined time interval.

19. The method according to claim 15, performed on a system for controlling a foundation brake of a vehicle having at least one foundation brake device comprising a control unit arranged to limit operation of the foundation brake to a non-zero predetermined total application-time of the foundation brake within a non-zero predetermined time interval, the control unit further being arranged to adjust a braking power of the foundation brake so that a deceleration provided during the application time of the foundation brake enables the vehicle to run without reapplication of the foundation brake for a non-zero predetermined foundation brake rest time.

20. Cruise control device comprising a system for controlling a foundation brake of a vehicle having at least one foundation brake device comprising a control unit arranged to limit operation of the foundation brake to a non-zero predetermined total application-time of the foundation brake within a non-zero predetermined time interval, the control unit further being arranged to adjust a braking power of the foundation brake so that a deceleration provided during the application time of the foundation brake enables the vehicle to run without reapplication of the foundation brake for a non-zero predetermined foundation brake rest time, wherein the cruise control performs a method according to claim 15.

* * * * *